United States Patent
Balconi et al.

(10) Patent No.: US 7,195,807 B2
(45) Date of Patent: Mar. 27, 2007

(54) METHOD FOR PROTECTING JOINTS FOR ELECTRICAL CABLES, PROTECTIVE COATING FOR SAID JOINTS AND JOINTS THUS PROTECTED

(75) Inventors: Luca Balconi, Bresso (IT); Alberto Bareggi, Milan (IT); Sergio Belli, Leghorn (IT); Alberto Bianchi, Cinisello Balsamo (IT); Dario Quaggia, Cinisello Balsamo (IT)

(73) Assignee: Prysmian Cavi e Sistemi Energia S.r.l., Milan (IT)

( * ) Notice: Subject to any disclaimer, the term of this patent is extended or adjusted under 35 U.S.C. 154(b) by 120 days.

(21) Appl. No.: 10/258,451

(22) PCT Filed: Apr. 20, 2001

(86) PCT No.: PCT/EP01/04508

§ 371 (c)(1),
(2), (4) Date: Jan. 28, 2003

(87) PCT Pub. No.: WO01/82436

PCT Pub. Date: Nov. 1, 2001

(65) Prior Publication Data

US 2004/0099434 A1   May 27, 2004

Related U.S. Application Data

(60) Provisional application No. 60/199,377, filed on Apr. 25, 2000.

(30) Foreign Application Priority Data

Apr. 25, 2000   (EP) .................................. 00108780

(51) Int. Cl.
*B32D 23/00* (2006.01)
*H01R 4/60* (2006.01)

(52) U.S. Cl. .................. 428/36.5; 428/36.9; 428/36.91; 174/74 R; 174/76; 174/77 R; 174/84 R; 174/85; 174/86; 174/92; 174/93

(58) Field of Classification Search ............... 428/36.5, 428/36.91, 36.9; 174/84 R, 110 F, 74 R, 174/76, 77, 92, 93, 77 R
See application file for complete search history.

(56) References Cited

U.S. PATENT DOCUMENTS 4,034,151 A   7/1977   Silva et al.

(Continued)

FOREIGN PATENT DOCUMENTS

EP   0 025 691 B1   3/1981

(Continued)

OTHER PUBLICATIONS

CENELEC, Harmonization Document, "Test Methods for Accessories for Power Cables with Rated Voltage from 3,6/6 kV (Um=7,2kV) up to an including 20,8/36 kV (Um=42 kV)" European Committee for Electrotechnical Standardization, pp. 16-17, Dec. 1995.

*Primary Examiner*—Hai Vo
(74) *Attorney, Agent, or Firm*—Finnegan, Henderson, Farabow, Garrett & Dunner, L.L.P.

(57) ABSTRACT

A method for mechanically protecting a connection between at least two components forming part of an electrical and/or telecommunications network. At least one protective coating is provided, the coating being produced from an expanded polymeric material and providing the connection with a mechanical impact strength and ensuring a predetermined heat exchange between the connection and the external environment. This coating is axially and circumferentially continuous with respect to the connection. The present invention also relates to a coating for the mechanical protection of a connection between two components and to a joint thus protected.

20 Claims, 5 Drawing Sheets

U.S. PATENT DOCUMENTS

| | | | |
|---|---|---|---|
| 4,104,210 A | 8/1978 | Coran et al. | |
| 4,383,131 A | 5/1983 | Clabburn | |
| 4,440,821 A | 4/1984 | Komura et al. | |
| 4,533,788 A | 8/1985 | Pokojny et al. | |
| 4,647,718 A | 3/1987 | Pokojny et al. | |
| 4,684,764 A | 8/1987 | Luzzi et al. | |
| 4,916,198 A | 4/1990 | Scheve et al. | |
| 5,952,612 A * | 9/1999 | Winfield et al. | 174/74 R |
| 6,768,060 B2 * | 7/2004 | Belli et al. | 174/110 F |

FOREIGN PATENT DOCUMENTS

| | | |
|---|---|---|
| EP | 0 050 009 | 4/1982 |
| EP | 0 093 617 B1 | 11/1983 |
| EP | 0 199 742 | 11/1986 |
| EP | 0 324 430 | 7/1989 |
| EP | 0 379 056 | 7/1990 |
| EP | 0 393 495 B1 | 10/1990 |
| EP | 0 415 082 A1 | 3/1991 |
| EP | 0 422 567 A2 | 4/1991 |
| EP | 0 541 000 A1 | 5/1993 |
| EP | 0 547 656 | 6/1993 |
| EP | 0 547 667 B1 | 6/1993 |
| EP | 0 735 639 A1 | 10/1996 |
| EP | 0 967 706 A1 | 12/1999 |
| GB | 1 497 051 | 1/1978 |
| GB | 2 069 773 | 8/1981 |
| WO | WO98/52197 | 11/1998 |

* cited by examiner

METHOD FOR PROTECTING JOINTS FOR ELECTRICAL CABLES, PROTECTIVE COATING FOR SAID JOINTS AND JOINTS THUS PROTECTED

CROSS REFERENCE TO RELATED APPLICATIONS

This application is a national phase application based on PCT/EP01/04508, filed Apr. 20, 2001, the content of which is incorporated herein by reference, and claims the priority of European Patent Application No. 00108780.8, filed Apr. 25, 2002, the content of which is incorporated herein by reference, and claims the benefit of U.S. Provisional Application No. 60/199,377, filed Apr. 25, 2000, the content of which is incorporated herein by reference.

BACKGROUND OF THE INVENTION

1. Field of the Invention

The present invention relates to a method for protecting a joint for electrical cables, in particular for underground electrical cables, to a protective coating intended to preserve the integrity of said joint once installed and to a joint for electrical cables thus protected.

2. Description of the Related Art

Generally cables for conveying or supplying energy, in particular for conveying or supplying medium-voltage or high-voltage energy, comprise, from the inside towards the outside of the cable: a metal conductor, an inner semiconductive layer, an insulating layer, an outer semiconductive layer, a metal screen—usually made of aluminium, lead or copper—and an external polymeric sheath. The predetermined sequence: metal conductor, inner semiconductive layer, insulating layer and outer semiconductive layer is generally known by the term "cable core".

In order to form a joint between two sections of electrical cable, for example of the single-pole type, the ends of both said sections are processed beforehand so as to expose, over a portion of defined length, each of the aforementioned elements which make up the abovementioned cables.

Subsequently, the joining operation consists in forming an electrical connection between the conductor elements, for example by means of soldering or scarfing of the latter, and positioning, in the zone where the said conductor elements are joined together, an elastomeric sleeve conventionally known by the term "joint".

Generally, said sleeve has a form which is substantially cylindrical in its central portion and of frustoconical type at its ends so as to provide an optimum connection between the cable sections being joined and the joint itself.

This sleeve consists of a plurality of radially superimposed elements intended to restore the electrical and mechanical connection between each exposed layer of a first cable section and the corresponding exposed layers of a second cable section.

Therefore, starting from its innermost portion, said sleeve generally comprises: a voltage distribution layer made of material with a high dielectric constant next to the insulating layers of the cable, a layer of insulating material of considerable thickness which surrounds said voltage distribution layer, and a layer of semiconductive material located radially on the outside of said insulating layer and suitably connected to the outer semiconductive layer of each cable section designed to restore the continuity of the outer semiconductive layers of said first and second section.

Generally, the zone where the two conductor elements are joined together is filled with an electrical-field control material.

Methods for constructing joints known in the art are described, for example, in documents EP-379,056; EP-393,495; EP-415,082; EP-199,742; EP-422,567 in the name of the Applicant.

Generally, this sleeve is produced separately and supplied fitted, in an elastically-dilated condition, on a hollow tubular support made of rigid plastic. The sleeve thus supported is engaged around one of the sections during a step preceding the formation of the joint between the metal conductors.

This support may be constructed using different methods which allow the removal thereof once the abovementioned joint has been formed. For example, the tubular support may be obtained from a strip-like element helically wound so as to form a plurality of adjacent spirals fastened together so that, when a pulling force is exerted on a free end portion of said strip-like element, the tubular support is able to collapse, due to gradual separation of the spirals, and allow correct positioning of the sleeve. In so doing, the sleeve elastically contracts, gripping the cable sections in the joining zone. This sleeve is of the cold-retractable type. Embodiments of said supports are described, for example, in the documents EP-541,000; EP-735,639; EP547,656; EP-547,667 in the name of the Applicant.

Alternatively, the sleeves may be made using heat-shrinkable materials, thus producing the so-called heat-shrinkable sleeves described, for example, in the patent U.S. Pat. No. 4,383,131.

Generally a joint also comprises an element intended to restore the metal screen, such as, for example, a tin-plated copper strip which is applied starting from the exposed metal screen portion of the first section and terminating on the exposed metal screen of the second section.

In the case where the joining operation is performed between two sections of electrical cable of the multi-pole—for example double-pole or triple-pole-type, the procedure described hitherto is repeated for each single phase of each cable.

Finally, a joint as defined further above normally also comprises an external polymeric sheath suitable for restoring the external mechanical protection of the cable and fitted in the joining zone, in a position radially on the outside of the aforementioned sleeve.

Generally, this sleeve is intended to protect the underlying elements of the joint from coming into contact with moisture and/or water from the outside.

Said sheath may be of the heat-shrinkable type or cold-shrinkable elastic type or may be obtained by means of a strip-forming step, which may also be combined with the use of suitable mastic sealants.

This sheath is inserted on one end of one of the said cable portions during a step preceding both positioning of the tubular support carrying the abovementioned sleeve and formation of the connection between the conductor elements.

In accordance with further operating methods, restoration of the external mechanical protection of the cable may also be achieved using several sheaths, for example three in number, arranged so that one pair of sheaths is fitted onto the aforementioned frustoconical portions of said joint and a further sheath is fitted onto the substantially cylindrical portion of the latter.

Generally, the zone where two cables for conveying or supplying electric energy are joined together inevitably forms a discontinuity in the conveying or supply network and, consequently, a weak point in the latter, also in view of the complexity of the aforementioned joining zone.

This complexity is due, in fact, both to the plurality of operations which must be carried out by the technical personnel responsible for installation of the joint and to the structure itself of the joint in that its composition, as regards its main components, is as described further above.

In order to ensure a high degree of mechanical protection, guaranteeing optimum and long-lasting operation, the joints are generally provided on the outside of their structure with a protective coating having a suitable form and made of suitable materials, which enclose the joining zone internally.

It must be emphasized, in fact, particularly if the cables are positioned, as in most cases, in trenches dug in the ground, that inevitably the joints themselves also have to be arranged in position and made operative inside the said trenches.

However, the latter represent an environment which is difficult to control since, owing to their nature they have restricted dimensions, accumulated debris is present along the edges of the excavations and the technicians preparing the joint move around and operate within them.

Under such working conditions it frequently happens that the debris and/or work equipment used by said technicians may accidentally strike the external surface of the joints and cause, for example, deformations in the layer of insulating material forming part of the latter.

These deformations are particularly undesirable since they cause a reduction in the insulating capacity of said layer, as well as separation of the latter from the semiconductive layer, thereby giving rise to partial discharges, resulting in irreversible damage to the joint.

Known systems for protecting the joints from the environment surrounding them, in particular from dust and moisture, envisage, for example, the use of particularly simple containers which use rapid-closure systems, for example of the bayonet type as described, for example, in the patent U.S. Pat. No. 4,684,764.

Devices known in the art and designed to provide the joints with protection of the mechanical type, for example against accidental knocks which, as mentioned, may occur during laying and/or installation, consist, for example, of rigid containers positioned outside the said joints.

Generally, said containers are divided into two halves which are formed so as to be arranged around the joining zone and provide it with the desired protection. Moreover, they are often made of metallic material, for example aluminium, coated externally with an anti-corrosive paint.

Said paint has the function of avoiding, or at least limiting, the development of any corrosive phenomena which, locally deteriorating the external surface of said containers, in addition to weakening the mechanical strength thereof, would allow the undesirable infiltration of moisture and/or water inside the joint.

Generally, these containers have dimensions greater than those of the joint to be protected since, on the one hand, it is unfeasible from an economic point of view to produce containers with specific dimensions for each type of joint and cable to be joined and, on the other hand, during assembly, it is necessary to ensure that there is sufficiently ample room for manoeuvre to perform correct and rapid positioning of the protective container on the said joint.

Generally, a filling material is introduced inside said containers, namely into the gap between the external surface of the joints and the internal walls of the containers, said filling material performing the function of providing a protective layer against any accidental knocks affecting the joint and providing the joint protection system with a greater mechanical strength. If necessary, said filling material is also chosen so as to form a barrier against the infiltration of moisture and/or water from the outside.

Generally, the filling material which is used is a thermosetting resin such as, for example, an epoxy, polyurethane or similar resin.

The document GB-1,497,051 describes a further mechanical protection device for cable joints, consisting of a heat-shrinkable elastomeric sleeve, the internal surface of which is coated with a plurality of reinforcing elements of elongated shape, arranged parallel to the longitudinal axis of said sleeve.

Said reinforcing elements are generally in the form of wires, bars or strips of metallic, plastic or fibreglass material, which are kept in position adjacent to each other, for example by means of an adhesive, a mastic or a support sheet.

The document EP-093,617 relates to a further mechanical protection device for electrical cable joints, comprising a set of elongated elements which are kept adjacent to each other on the external surface of the joint and a hot-shreankable or cold-shreankable sleeve designed to be positioned around said set.

These elements, which are preferably made of metallic material, are fastened to each other so as to form a kind of cage structure by using, for example, cords, hooks, soldering zones, support sheets provided with an adhesive element or flexible strips.

Owing to the presence of said plurality of elements, this assembly is able to follow the profile of the joint where there are changes in its cross-section, reducing the overall dimensions of the coupling between protection device and joint.

In order to ensure that such a result may be achieved, each of the said elements is formed so as to have a substantially straight progression along the substantially cylindrical portions of the underlying joint and a diverging or converging progression where the cross-section of the joint respectively becomes thicker or thinner.

The abovementioned shreankable sleeve, which may also not be present, generally has a longitudinal extension greater than that of said elements so that the sleeve may make contact with a cable portion upstream of the joint and a cable portion downstream of the joint, sealing off the latter from the surrounding environment.

The Applicant has noticed that the protection devices for joints according to the known art have a plurality of drawbacks.

For example, in order to ensure a satisfactory mechanical impact strength, in the case where said device is in the form of a container located on the outside of the joint, generally this container is made of a material sufficiently rigid to safeguard the joint contained therein, for example metal or plastic material.

However, this feature is viewed as being particularly unfavourable since this material, being rigid, does not allow damping of an impact resulting from, for example, excavation debris falling inside the trench where the cable is laid, as the energy contained in said debris is transferred practically entirely onto the underlying joint.

Moreover, if this impact is particularly violent, it may cause permanent deformation of the protective container, resulting in it being ineffective in the damaged zone in the event of any renewed accidental impacts in the same zone and resulting in continuous crushing of the elements of the joint, adversely affecting the operation thereof.

As mentioned further above, in the case where the protective container is of the metallic type, it is generally coated with an anti-corrosive paint so as to prevent the occurrence of corrosive phenomena due to attack by water and/or moisture inevitably present in the ground.

However, the use of this anti-corrosive paint does not eliminate entirely this risk since any debris falling onto the external surface of the protective container inevitably forms incisions on the latter, even of a limited nature, resulting in removal of the paint.

These zones, therefore, constitute areas favouring the development of corrosion which, in particularly favourable environmental conditions, may develop rapidly and adversely affect the protective capacity of the container.

Containers of the metallic type do not have, moreover, any flexibility in the longitudinal direction, this aspect making installation thereof in an operative condition less easy.

In order to prevent water and/or moisture from spreading towards the joint to be protected, as mentioned further above, some solutions of the known art envisage using a filling material to be positioned in the gap between the container and the external surface of the joint. However, the use of this filling material has a few drawbacks.

A first drawback consists in the complexity of the protective system since the installation process envisages a first step for arranging the container around the joint and a next step during which the filling material is introduced into the space between joint and container and said material is left to harden or made to harden for example by using heat.

This means, therefore, that the operation involving preparation of the protective coating of the joint is fairly complex and requires a fairly long assembly time and the use of qualified technical personnel—these aspects obviously resulting in a substantial increase in the installation costs.

A further drawback consists in the fact that the structure of the protective container is necessarily more complex since it is necessary to provide at least one inlet opening for the coating material, a device for closing the said opening as well as a sealing system both for the inlet opening and for the connection zone between the two half-shells which generally form the abovementioned protective container.

Moreover, if the filling material should be a thermosetting resin, as is the case in nearly all installation processes, this aspect constitutes a further disadvantage due to the nature itself of this resin. Handling of the latter, in fact, generally requires the use of suitable precautionary measures and a considerable degree of care since said resins are irritants (to the skin, eyes or respiratory tract) and, in some cases, are even toxic.

It is necessary to point out, moreover, that the use of a protective container according to the known art has the further drawback that it requires an operation involving joining together of the two halves forming it, said operation being performed manually and directly on-site, namely within the laying trench and therefore in precarious conditions, with limited freedom of movement. All this results in greater complexity of operation and an inevitable delay in the installation time.

The technical solution described in the document EP-093,617 referred to above goes beyond the traditional concept of a protective device in the form of a container and suggests the use of a device comprising a set of elongated elements and a retractable sleeve to be arranged around the latter.

However this solution, which is based on a concept different from that of the prior art, also has certain drawbacks.

A first drawback, which is particularly significant for the purposes of achieving an acceptable mechanical strength of the joint, consists in the fact that the type of combination of the above-mentioned elongated elements does not allow the formation of a continuous protective layer able to ensure the same level of protection against impacts over the whole external surface of the joint.

In fact, these elements are arranged alongside each other in the longitudinal direction, parallel to the longitudinal direction of the joint, without forming a continuous protective layer on the outside and over the circumference of the joint.

A further disadvantage of the device according to the document EP-093,617 consists in the fact that the elongated elements which form it are made preferably of metallic material or of moulded plastic material.

As mentioned further above with reference to the containers of the known art, the use of a metallic material for protective purposes is disliked since the device is excessively rigid and is unable to dampen the impacts to which it may be subject, transferring practically entirely the impact energy onto the underlying layers.

Moreover, the choice of these materials results in the protective device being particularly heavy, thereby aggravating the working conditions of the technical personnel responsible for joining the cables.

Furthermore, plastic materials in general do not have a high resistance to violent impacts unless special polymer products are used.

A further problem which the solutions of the known art are unable to solve in a satisfactory manner consists in the disposal of the heat which is produced inside a joint following the passage of electric current. In fact, should said heat not be adequately disposed of, a hot point is formed in the distribution system, said hot point consisting of the joint itself. This fact results in an undesirable reduction in the current flow rate inside the cable.

In order to ensure an at least partial disposal of said heat, the solution of the known art relating to a container filled with filling material requires that the thickness of said material should be sufficiently small. However, if this thickness is particularly small, the mechanical strength of the protective coating is inevitably weakened.

The Applicant has therefore established the need to provide a mechanical protection for electrical cable joints which is able to guarantee a high mechanical impact strength, with particular reference to the installation of underground electrical lines, and an optimum disposal of the heat in the joining zone, this protective coating having a reduced thermal resistance, not being affected by particular problems of toxicity and/or handling and not influencing negatively the weight and the thickness of the joint/protective coating assembly.

The Applicant has perceived, moreover, that there is a need to devise a method for protecting joints which can be implemented in a simple manner and with little effort by the operator and which does not require complex operations, resulting in advantages both in terms of the speed of installation and in terms of lower costs.

SUMMARY OF THE INVENTION

The Applicant has found that this objective is achieved by providing on the external surface of the joint a protective coating made of expanded polymeric material with a predefined thermal resistance.

Therefore, according to a first aspect thereof, the present invention relates to a method for mechanically protecting a connection between at least two components forming part of an electrical and/or telecommunication network, comprising the step of providing at least one protective coating around said connection, characterized in that said coating is produced using an expanded polymeric material suitable for providing said connection with a mechanical impact strength and, at the same time, ensuring a predetermined heat exchange between said connection and the external environment.

In accordance with a first embodiment, said connection is enclosed inside said protective coating.

According to a further embodiment, said connection is helically wound with said protective coating.

In a further embodiment, said protective coating is obtained by linking together a plurality of separate elongated bodies arranged around said connection.

According to a second aspect thereof, the present invention relates to a coating for mechanically protecting a connection between at least two components forming part of an electrical and/or telecommunication network, characterized in that said coating, arranged in a position radially outside said connection, is made of an expanded polymeric material and both provides said connection with a mechanical impact strength and ensures a predetermined heat exchange between said connection and the external environment.

Preferably, said coating is axially and circumferentially continuous with respect to said connection.

This coating is in the form of a sheet or is in tubular form or is of the modular type, comprising, in this latter case, a plurality of separate elongated bodies linked together around said connection.

According to a third aspect thereof, the present invention relates to a joint for electrical cables designed to convey or supply energy, said joint comprising:

at least one electrical connection between a conductor of a first electrical cable and a conductor of a second electrical cable;

at least one electrical insulating layer arranged in a position radially outside said connection, and a protective coating arranged in a position radially outside said electrical insulating layer, characterized in that said coating is made of an expanded polymeric material and is suitable for providing said connection with a mechanical impact strength and, at the same time, ensuring a predetermined heat exchange between said connection and the external environment.

BRIEF DESCRIPTION OF THE DRAWINGS

The description, provided hereinbelow, relates to the accompanying drawings provided solely by way of explanation and not intended to be limiting in any way, where.

DETAILED DESCRIPTION OF THE INVENTION

The description which follows and the figures associated therewith illustrate the case where the protective coating and method according to the present invention relate to an electrical connection between two electrical cables for conveying or supplying electric energy.

It must be emphasized, however, that generally this protective device and method may be applied to any electrical or optical connection forming part of an electrical and/or telecommunication network.

Moreover, the present invention may advantageously be used also as a mechanical protection system for a zone where there is a connection between a cable and any apparatus.

As will emerge more clearly from the present description, which concentrates on a zone where two electrical cables are joined together, the structural aspects characteristic of the numerous types of joint which may be operationally realized will not be described in great detail since they are outside the scope of the present invention, for the purposes of which the type of joint considered does not constitute an aspect limiting the said invention.

Figure 1:
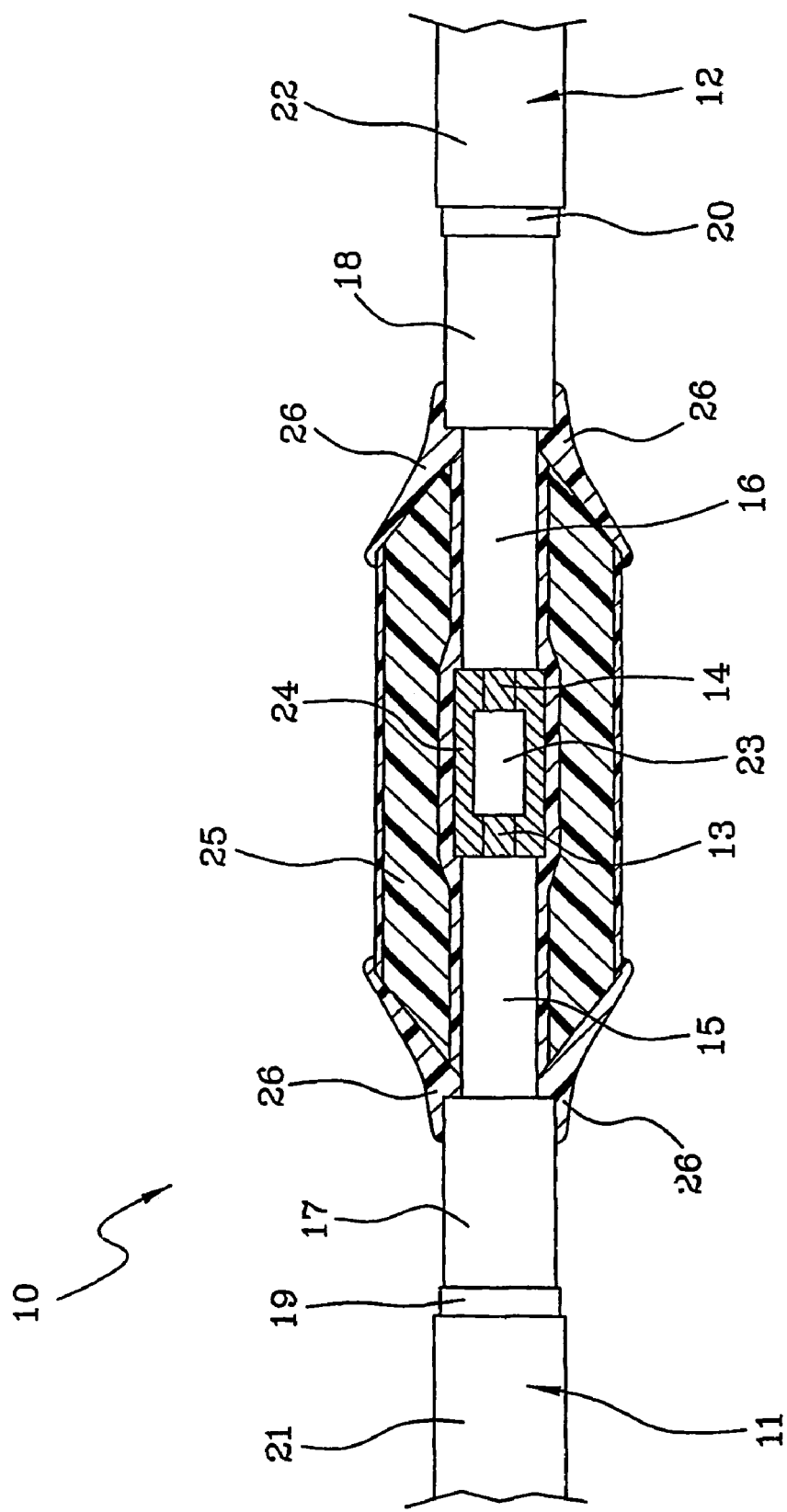
FIG. 1 shows a partially axially-sectioned, schematic side view of the joining zone of two single-pole electrical cables according to an embodiment of the known art.

In FIG. 1 reference sign 10 denotes generically a joint according to an embodiment of the known art, intended for the electrical connection of a pair of cables 11, 12 of the single-pole type.

As already mentioned, this joint is obtained by arranging, coaxially facing each other, the ends of said cables 11, 12 progressively stripped of their associated coating layers forming part of the respective conductors 13, 14 which are exposed over a predefined section.

The coating of said cables 11, 12 is removed by exposing, for each cable and over a given length, in succession the insulating layer 15, 16, the outer semiconductive layer 17, 18, the metallic screen 19, 20 and the external polymeric sheath 21, 22.

As shown, the exposed end portions of each conductor 13, 14 are electrically connected together by means of an element 23 which is known per se and consists, for example, of a soldering zone or a suitable scarfing system.

Once the electrical connection between the abovementioned conductors 13, 14 has been performed, the space corresponding to the removed sections of insulating material 15, 16 is filled with a deformable, field-control, filling material 24 which is known per se.

The joining zone is covered by a sleeve 25, made of elastic material, for example a cross-linked polymeric material, which is slidably fitted onto one of the cables 11, 12 before they are connected together and positioned above said joining zone once said element 23 and the filling material 24 have been applied.

Said sleeve 25 is freed above the joining zone using known techniques—for example by means of a removable support element, as mentioned above—so as to form a coating covering the exposed sections of the insulating layer 15, 16.

Alternatively, the sleeve 25 may consist of a heat-shrinkable material.

Additional elements 26, which are also well-known to persons skilled in the art, are arranged so as to line the ends of said sleeve 25 and restore the continuity of the screen, said additional elements 26 being connected to the external semiconductive layer 17, 18 of the two cables 11, 12.

Figure 2:
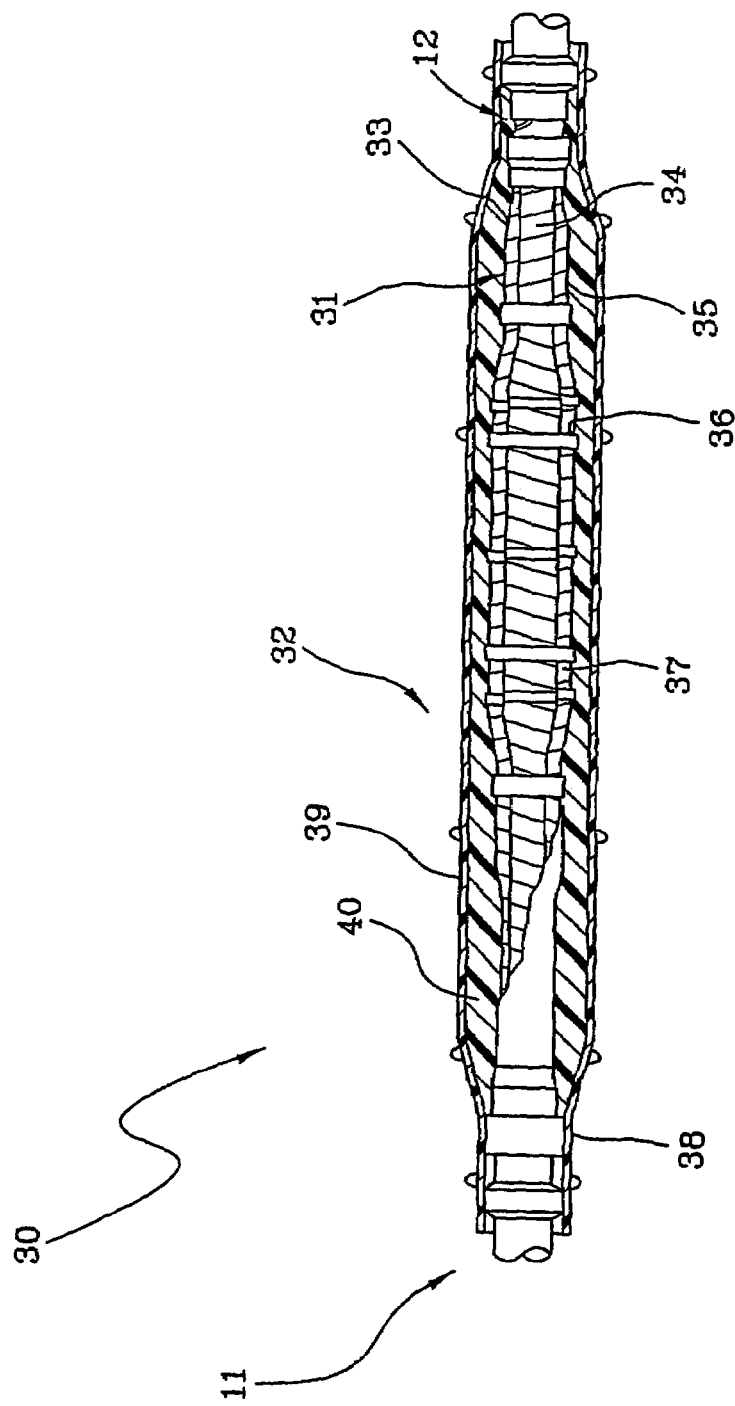
FIG. 2 shows a partially-sectioned side view of a type of protective coating according to the known art.

In FIG. 2 the reference number 30 denotes overall a joint 31 for example of the type shown in, FIG. 1, provided with a protective coating 32 according to the known art.

In greater detail, the joint 31 is partially sectioned so that the pair of cables 11, 12 being joined together are visible, said cables, unlike that shown in FIG. 1, being of the three-pole type. The cores of said cables have been indicated overall by the reference numbers 33, 34, 35.

In FIG. 2 it is possible to distinguish, moreover, the binding elements 36, 37 generally consisting of a reinforced adhesive tape which keeps, joined together, the individual phases in the central joining zone and the external sheath 38, for example of the heat-shrinkable type coating the joint 31.

The protective coating 32 comprises an external container 39—called "muffle" in technical jargon—which is preferably made of metallic material and which receives, inside it, filling material 40 which, as mentioned further above, is generally a thermosetting resin.

Figure 3:
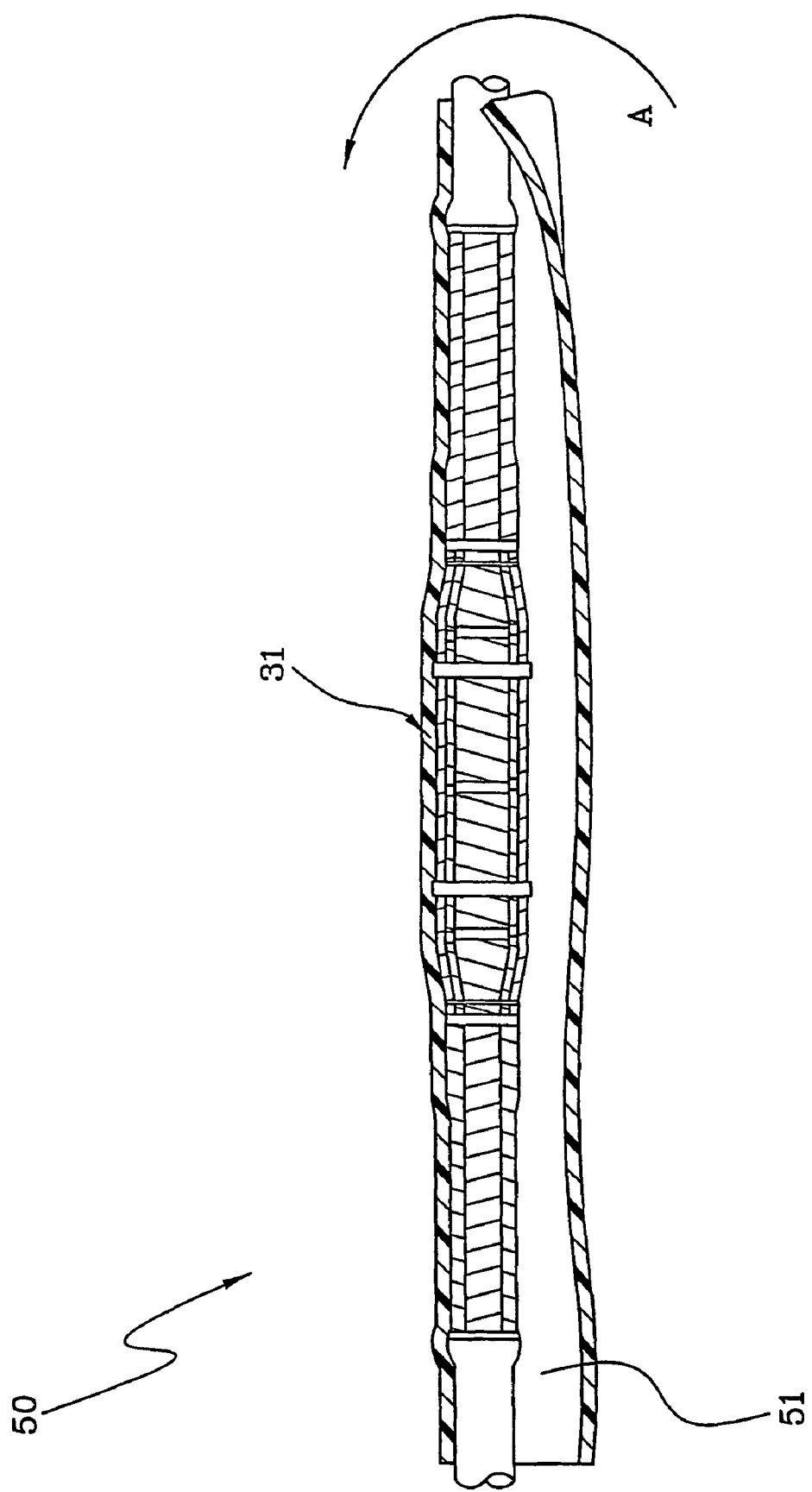
FIG. 3 shows a perspective view of an embodiment of the protective coating according to the present invention.

In FIG. 3 the reference number 50 denotes overall a joint according to the invention comprising the joint 31 according to FIG. 2 and a protective coating 51 according to an embodiment of the present invention.

In accordance with the embodiment shown, said protective coating 51 is in sheet form and can be wound in a position radially outside the joint 31, as indicated by the arrow A in FIG. 3, enclosing inside it the said joint.

Said protective coating 51 therefore encloses the joint 31, closely following the external profile and adapting to variations in its cross section in the zone where the two electrical cables are joined together.

In the embodiment shown in FIG. 3, the protective coating 51 is positioned beneath the external sheath 38 (not shown in FIG. 3) which, as mentioned, is conventionally arranged in a position radially outside the joint 31 on completion of the latter.

In this case, therefore, once in position, the protective coating 51 is kept in the correct operating condition by the external sheath 38 which covers it.

In accordance with a further embodiment (not shown), the protective coating 51 is arranged above the external sheath 38 in a manner similar to that shown in FIG. 2 with reference to the muffle 39.

In this case, said protective coating 51 is kept in position by using a suitable fixing system, for example by arranging adhesive tape along its circumferential extension and at predetermined distances along its longitudinal extension.

In accordance with a further embodiment (not shown), the protective coating 51 is obtained by providing at least two successive windings of said continuous sheet so as to define at least one pair of superimposed continuous layers. This embodiment may be envisaged where, in particularly critical operating situations, it is necessary to ensure a particularly high mechanical strength.

Figure 4:
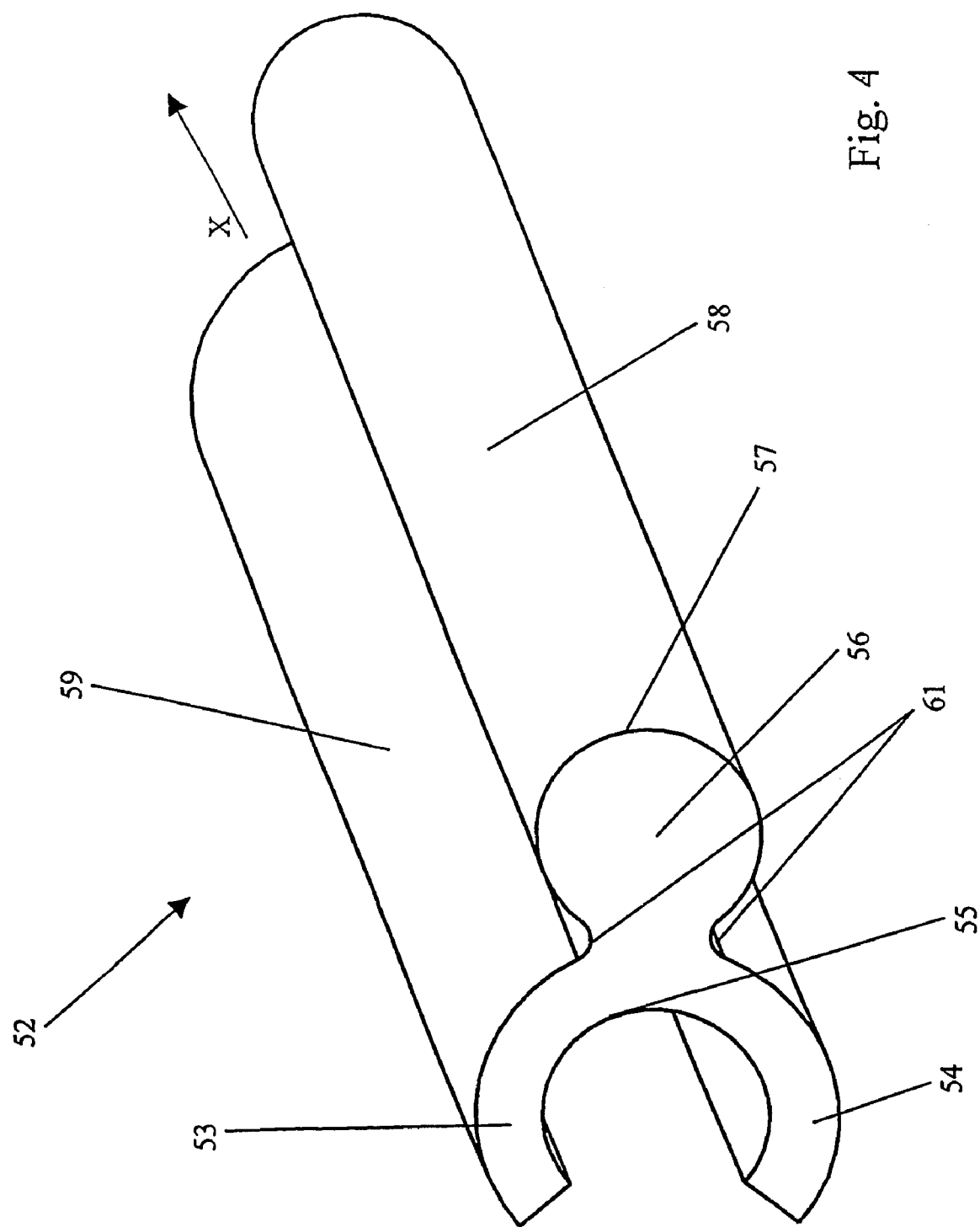
FIG. 4 shows a perspective view of an elongated element according to a further embodiment of the present invention.
Figure 5:
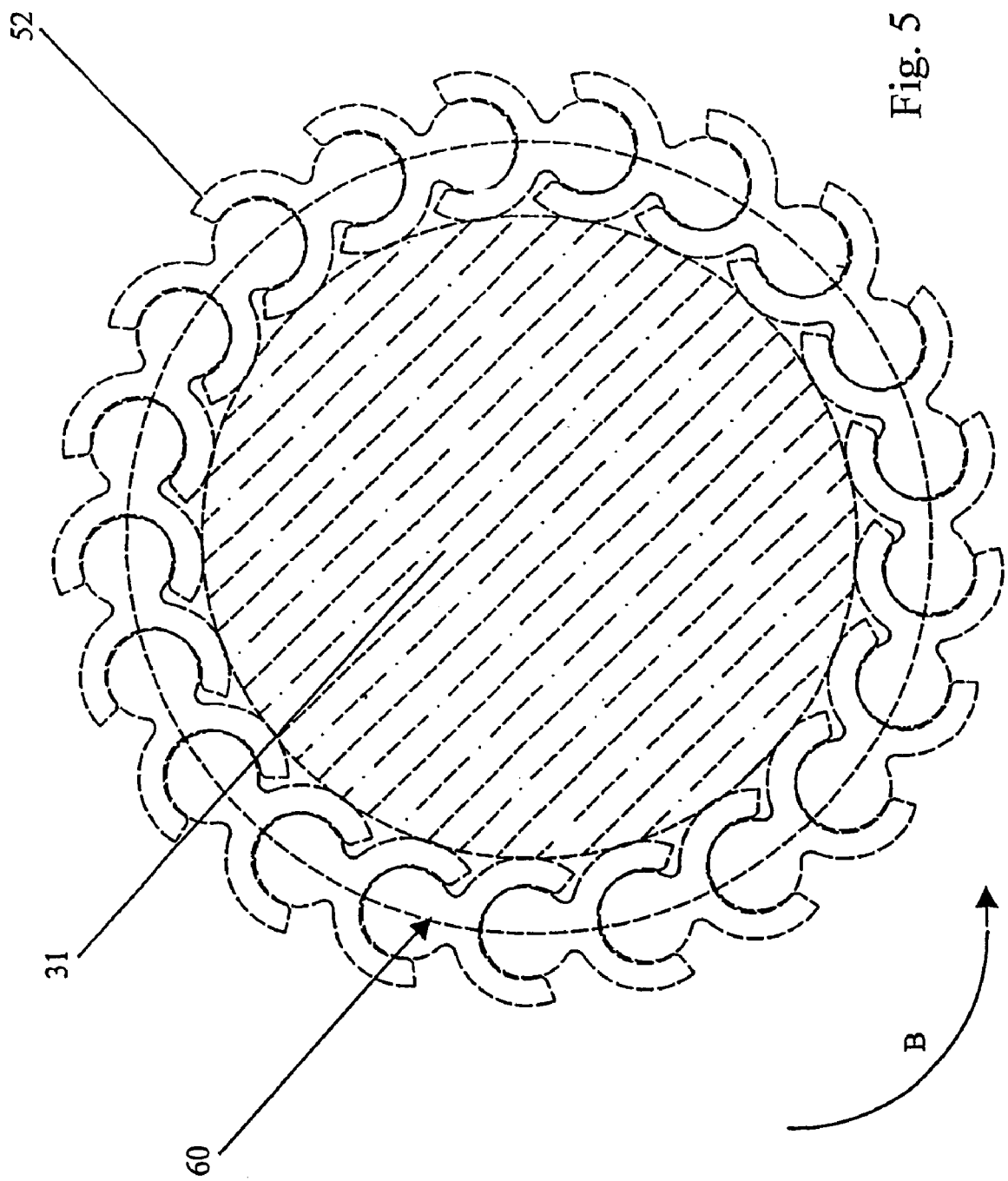
FIG. 5 shows a cross section through a protective coating formed by a continuous succession of elongated elements of the type illustrated in FIG. 4.

With reference to FIGS. 4 and 5, a protective coating 60 according to a further embodiment of the present invention is shown.

Said protective coating 60 (shown in FIG. 5) comprises a plurality of elongated bodies 52 which are arranged substantially parallel to each other and coaxial with respect to the axis of the cables to be joined together, being linked so as to define the above-mentioned protective coating 60 in a position radially outside said joint 31.

For the purposes of the present description and the following claims, the term "continuous protective coating" is understood as meaning a uniform and uninterrupted protective coating, both in the axial direction and in the circumferential direction, over the whole extension of the joining zone. This means that there are no portions of said joining zone—even with a limited extension—devoid of said protective coating.

Therefore, in accordance with the present invention, the protective coating is not necessarily made in the form of a continuous sheet 51, but may also be obtained by linking together a plurality of separate bodies 52 provided that this linkage defines, in any case, a protective coating of the continuous type which completely coats the external surface of the joint.

As already mentioned, FIG. 4 shows a perspective view of a particular embodiment of said elongated bodies 52, linking together of which results in the formation of the protective coating 60, the circumferential extension of which is indicated by the broken lines in FIG. 5.

Said elongated bodies 52, viewed in cross section, have a shape substantially in the form of a Y which has proved to be particularly advantageous for the purposes of rapid, simple and efficient linking together of said bodies.

In greater detail, the diverging and slightly rounded sections 53, 54 of said Y define a curved profile mating with the base section 56 of said Y.

In this way, therefore, the external curved profile 57 of the base section 56 of a given elongated body 52 is able to mate with the curved profile 55 of a body 52 preceding it, with reference to the direction of engagement indicated by the arrow B in FIG. 5.

Moreover, the longitudinal extension of said bodies 52, in the direction X of FIG. 4, is such that the linking together of said bodies allows the joining zone to be coated over its whole extension.

Each base section 56, once inserted between the diverging sections 53, 54 of a body 52 adjacent to it, forms an articulation point for the circumferential extension of the protective coating 60 since the curved profile 55 referred to above is partially free to slide along the abovementioned external curved profile 57 of the base section 56.

As can be clearly understood from FIG. 5, said sliding action is only partial since the ends of the diverging sections 53, 54 cannot be displaced beyond the zones 61 where said diverging sections 53, 54 are joined to said base section 56.

In accordance with this embodiment, the protective coating 60 has a particularly advantageous modular feature since it may be adapted easily and rapidly to any type and size of joint.

In FIG. 5, the joint 31, which is illustrated with a protective coating 60 in a position radially on the outside thereof, obtained by means of the sequential arrangement of the plurality of elongated bodies 52, is not shown in detail and the portion shown in broken lines in the figure indicates generally its external circumferential dimensions in a cross section thereof.

The continuous protective coating 60 according to the present embodiment may be obtained, for example, by inserting with pressure the portion 58 of a first body 52, namely the portion corresponding to the base section 56 of the Y, into the space defined by the portions 59, namely the portions corresponding to the diverging sections 53, 54 of said Y, of a second body 52 which precedes/follows said first body.

In accordance with a further embodiment, the portion 58 of a first body 52, instead of being pushed with pressure into the space defined by the portions 59 of the second body 52, is inserted into said space by means of simple sliding.

As can be seen from FIG. 5, the particular geometry of the elongated bodies 52 allows the formation of a protective coating 60 which surrounds entirely the external surface of the joint 31.

Therefore, if debris should accidentally strike the joint 31, the protective coating 60 according to the present invention ensures continuous protection also in the zones for connection of a body 52 with the bodies which precede it and follow it, respectively.

The particular geometry of the elongated body 52 shown in FIG. 4 constitutes one of the possible solutions which may be adopted in order to—form a protective coating 60 of the modular type. For example, the diverging arms 53, 54 of the elongated body 52, instead of having a joining profile 55 of the curved type, may have a profile in the form of a dovetail or an arrow. Similarly the base section 56 of said Y must also be provided with a configuration mating with said diverging arms.

The protective coating according to the present invention is installed in a simple and rapid manner directly on-site, namely inside the excavation trench, by the personnel performing the joining operation.

In the case where said protective coating is in sheet form (as shown in FIG. 3), it is wound around the joint using the methods described further above.

In a further embodiment, said sheet does not have a length equal to the longitudinal extension of the joint and a width at least equal to the circumferential profile of the latter so as to cover the joint with a single winding, but has dimensions such that it may be wound helically around said joint forming a sort of taped arrangement with predetermined partial overlapping of its edges.

If, however, said protective coating is formed using a plurality of elongated bodies, the latter are joined together, as already mentioned, directly in position, being of a number such as to cover the circumferential extension of the joining zone.

In this embodiment, completion of the protective coating may be achieved by joining together the first and the last of said elongated bodies, if necessary forming a circumferential extension slightly greater than that of the joint, or by providing an overlapping piece between the first body and the last body, fixing said overlapping piece by means of suitable fixing elements, for example adhesive tape.

The protective coating according to the present invention is therefore able to achieve a dual aim: provide the joint with a system for mechanical protection against knocks and ensure correct transfer of heat between the joint and the external environment in order to prevent the formation of a hot spot—i.e. the joint itself—inside the system for conveying or supplying the electric energy.

As regards the first of the above-mentioned aims, as already mentioned during the course of the present description, a joint for electrical cables, in view of the particularly difficult installation environment, requires a protective coating which preserves the structural integrity of said joint both during the installation phase, which is particularly critical, and during operation of said joint.

The protective coating according to the present invention, owing to the type of material used and the geometrical design developed, ensures optimum mechanical protection while maintaining minimal weight and dimensions, as will be explained more clearly in the following of the present description.

As regards the second of the above-mentioned aims, it has to be remembered that, in general terms, the flow of an electric current inside a conductor inevitably results in heating of the said conductor which is proportional to the square of the intensity of said current. Therefore, after the flow of said current, a rise in temperature occurs inside the cable.

Consequently, for the same cross section of the conductor and on the basis of the desired current intensity of the flow within the system, the task of the designer is to choose suitably the material of the insulating layer of the cable so that, to avoid deterioration in the electrical/mechanical characteristics of said layer, this temperature—i.e. the maximum permissible temperature—is not exceeded.

Moreover, this increase in temperature also depends on the thermal resistance of the cable/joint/protective coating system, which must be sufficiently small so that there is a suitable heat exchange with the exterior and the abovementioned maximum permissible temperature is not exceeded.

Generally, in a joint for electrical cables, in operating conditions, the situation which is created when electric current flows inside the conductors is similar to that described above with reference to a cable.

However, the thickness of the insulating layer of a joint must be greater than the corresponding thickness of the insulating layers of the cables being joined together.

This necessity is dictated by the fact that, unlike a cable which is manufactured in a controlled environment and using a continuous process (for example extrusion), a joint is prepared directly on-site and requires a significant amount of manual labour for its preparation.

In the case of a joint, therefore, the working environment is not controlled—for example is contaminated by dust and moisture—and, moreover, the joining operations are performed manually and, consequently, less precisely and with a high risk of contamination of the materials forming the said joint.

It has to be emphasized that this contamination is particularly harmful since it produces a deterioration in the electrical properties of the insulating layer, with a consequent reduction in the value of the permissible electrical stressing of said layer.

Therefore, in order to ensure a satisfactory safety margin, the thickness of the insulating layer of a joint is generally increased with respect to the thickness of the insulating layer of a cable.

However, since, as emphasized further above, the thermal resistance increases with the increase in the thickness, as regards the above, the insulating layer of the joint has, for the same material used, a thermal resistance which is greater than that of the insulating layer of the electrical cables in the cable portions upstream and downstream of the joining zone.

The result of this is that, following the flow of electric current and the consequent above-mentioned temperature rise, the temperature difference between conductor and external environment is greater in the joint than in the cables. In other words, for the same current flowing within the conductor, the joint is subject to a greater degree of heating than the cables. This aspect is particularly critical since, as already mentioned, should the maximum permissible temperature of the insulating material of the cable be reached within the joint, in order to prevent a deterioration in the electrical and mechanical characteristics of the latter, it would be necessary to decrease the current density of the line and, consequently, the current-carrying capacity inside the system.

This effect is further accentuated if the joint is provided with a mechanical protection system which does not allow optimum heat exchange between conductor and external environment.

In this case, in fact, the temperature rise inside the joint would be such as to impose an unacceptable limit on the current-carrying capacity of the system.

In order to ensure a satisfactory heat exchange, as mentioned further above, a filling material with a low thermal resistivity is introduced into the protective containers for joints of the known art.

However, the thickness of this filling material may not be reduced excessively since the external protective container, which is generally made of metallic material, is unable to dampen the impacts which are transmitted, almost entirely, to the underlying layers.

A large thickness of said filling material on the one hand, therefore, allows greater damping of the impacts, but on the other hand results in an increase in the thermal resistance of the system—owing to the increased thickness—and greater overall dimensions of the joint/protective container assembly.

The protective coating made of expanded polymeric material according to the present invention ensures, however, excellent mechanical resistance which is effective over the whole external surface of the joint—owing to the continuity of the coating—while allowing extremely small thicknesses of the coating which allow a reduction in the thermal resistance of the system as a whole. In this way, the temperature of the cable inside the joint does not exceed the maximum permissible temperature of the cable in portions far from the joint and, consequently, the joint does not impose a limit on the current-carrying capacity of the system.

In accordance with the present invention, the protective coating has a thickness of between 3 mm and 25 mm, preferably between 3 mm and 15 mm, more preferably between 3 mm and 10 mm.

The protective coating according to the present invention is produced from an expanded polymeric material, this term being understood as meaning a polymeric material having a predetermined percentage of "free" space within the material, namely a space not occupied by the polymeric material, but by gas or by air.

Generally, this percentage of free space in an expanded polymer is expressed by means of the so-called "degree of expansion" (G), defined as follows:

$$G=(d_0/d_e-1)*100$$

where $d_0$ indicates the density of the non-expanded polymer and $d_e$ indicates the apparent measured density of the expanded polymer.

The protective coating made of expanded polymeric material according to the present invention is obtained from an expandable polymer optionally subjected to cross-linking, following expansion, as indicated in greater detail in the continuation of the present description.

This expandable polymer may be chosen from the group comprising: polyolefins, copolymers of various olefins, unsaturated ester/olefin copolymers, polyesters, polycarbonates, polysulphones, phenolic resins, ureic resins, and mixtures thereof. Examples of suitable polymers are: polyethylene (PE), in particular low density PE (LDPE), medium density PE (MDPE), high density PE (HDPE) and low-density linear PE (LLDPE); polypropylene (PP); ethylene-propylene elastomeric copolymers (EPM) or ethylene-propylene-diene terpolymers (EPDM); natural rubber; butyl rubber; ethylene/vinyl ester copolymers, for example ethylene/vinyl acetate (EVA); ethylene/acrylate copolymers, in particular ethylene/methyl acrylate (EMA), ethylene/ethyl acrylate (EEA), ethylene/butyl acrylate (EBA); ethylene/α-olefin thermoplastic copolymers; polystyrene; acrylonitrile-butadiene-styrene (ABS) resins; halogenated polymers, in particular polyvinyl chloride (PVC); polyurethane (PUR); polyamides; aromatic polyesters, such as polyethylene terephthalate (PET) or polybutylene terephthalate (PBT); and their copolymers or mechanical mixtures thereof.

Preferably, the polymeric material is a polyolefinic polymer or copolymer based on ethylene and/or propylene and in particular chosen from:

(a) copolymers of ethylene with an ethylenically unsaturated ester, for example vinyl acetate or butyl acetate, in which the quantity of unsaturated ester is generally between 5% and 80% by weight, preferably between 10% and 50% by weight;

(b) elastomeric copolymers of ethylene with at least one $C_3$–$C_{12}$-α-olefin, and optionally a diene, preferably ethylene-propylene copolymers (EPR) or ethylene-propylene-diene (EPDM) having preferably the following composition: 35–90 mol % of ethylene, 10–65 mol % of α-olefin, 0–10 mol % of diene (for example 1,4 hexadiene or 5-ethylidene-2-norbornene);

(c) copolymers of ethylene with at least one $C_4$–$C_{12}$-α-olefin, preferably 1-hexene, 1-octene and the like, and optionally one diene, generally having a density of between 0.86 g/cm$^3$ and 0.90 g/cm$^3$ and the following composition: 75–97 mol % of ethylene, 3–25 mol % of α-olefin, 0–5 mol % of a diene;

(d) polypropylene modified with ethylene/$C_3$–$C_{12}$-α-olefin copolymers, in which the ratio by weight between polypropylene and the ethylene/$C_3$–$C_{12}$-α-olefin copolymer is between 90/10 and 30/70, preferably between 50/50 and 30/70.

For example, the commercial products Elvax® (Du Pont), Levapren® (Bayer), Lotryl® (Elf-Atochem) are included in class (a), the products Dutral® (Enichem) or Nordel® (Dow-Du Pont) in class (b), and the products Engage® (Dow-Du Pont) or Exact® (Exxon) in class (c), while polypropylene modified with ethylene/α-olefin copolymers may be found on the market under the trade names Moplen® or Hifax® (Montell), or Fina-Pro® (Fina), and the like.

In class (d), particularly preferred are the thermoplastic elastomers comprising a continuous matrix of a thermoplastic polymer, for example polypropylene, and small particles (generally having a diameter of the order of 1–10 μm) of a vulcanized elastomeric polymer, for example cross-linked EPR or EPDM, dispersed in the thermoplastic matrix. The elastomeric polymer may be incorporated in the thermoplastic matrix in the non-vulcanized state and therefore dynamically cross-linked during the process through the addition of a suitable quantity of a cross-linking agent. Alternatively, the elastomeric polymer may be vulcanized separately and subsequently dispersed in the thermoplastic matrix in the form of small particles. Thermoplastic elastomers of this type are described, for example, in the documents U.S. Pat. No. 4,104,210 or EP-324,430.

Among the polymeric materials particular preference is given to a high melt strength polypropylene, as described, for example, in the patent U.S. Pat. No. 4,916,198, commercially available under the trade names Profax® and Higran® (Montell S.p.A.). This document describes a process for the production of said polypropylene by means of a step involving irradiation of a linear polypropylene performed by means of a high-energy ionizing radiation and for a period of time sufficient to cause the formation of a significant quantity of long branches in the chain, said step being followed upon completion, moreover, by a suitable treatment of the irradiated material so as to deactivate substantially all free radicals present in the irradiated material.

Even more preferably, among the polymeric materials particular preference is given to a polymer composition comprising the abovementioned polypropylene with a high degree of branching, in a quantity generally of between 30% and 70% by weight, in a mixture with a thermoplastic elastomer of the type belonging to class (d) mentioned above, in a quantity generally of between 30% and 70% by weight, said percentages being given relative to the total weight of the polymer composition.

The protective coating according to the present invention may be produced by means of different techniques, for example by means of moulding or extrusion.

A moulding operation is preferred, for example, if the protective coating according to the invention is in the form of a sheet to be wound around the joint to be protected.

If, however, said protective coating is obtained by linking together a plurality of elongated bodies, the latter are preferably formed by means of extrusion and subsequently cut to size.

By means of extrusion it is also possible to produce a protective coating in tubular form (further embodiment not illustrated) which does not require any winding operation, but which must be inserted beforehand onto one end of a cable, without any joining step, so that it may be subsequently fitted onto the external surface of the joint.

With an extrusion operation it is also possible to obtain bodies having a cross section with any geometrical shape required, for example such as that illustrated in FIG. 4.

In order to facilitate the extrusion operation, which is per se conventional and therefore not described in detail hereinbelow, said bodies may be provided with a central, generally metallic core.

The latter performs the function of a support element which is acted on, during extrusion of the expanded polymeric material, by the pulling force of a pulling device—for example a pulling capstan—designed to receive the continuous extruded product, prior to the abovementioned operation involving cutting to size.

This central core may be subsequently removed, leaving a through-hole in the portion 58 of each body 52, said hole providing said portion with a greater elasticity which is particularly advantageous during interconnection of said bodies.

Expansion of the polymeric material is performed during the extrusion or moulding step and may take place either chemically, through the addition of a suitable expanding agent, i.e. an agent capable of producing a gas under given pressure and temperature conditions, or physically, by means of injection of high-pressure gas directly into the extruder cylinder.

Examples of suitable expanding agents are: azodicarbamide, para-toluenesulfonyl hydrazide, mixtures of organic acids (for example citric acid) with carbonates and/or bicarbonates (for example sodium bicarbonate), and the like.

Examples of gases which may be injected under high pressure into the extruder cylinder are: nitrogen, carbon dioxide, air, low-boiling hydrocarbons, for example propane or butane, halogenated hydrocarbons, for example methylene chloride, trichlorofluoromethane, 1-chloro-1,1-difluoroethane, and the like, or mixtures thereof.

It has been observed that, for the same extrusion conditions (such as speed of rotation of the screw, speed of the extrusion line, diameter of the extruder head), one of the process variables which influences most the degree of expansion is the extrusion temperature. Generally, in the case of extrusion temperatures lower than 130° C., it is difficult to obtain a sufficient degree of expansion; the extrusion temperature is preferably at least 140° C., in particular about 180° C. Normally, a greater degree of expansion corresponds to an increase in the extrusion temperature.

Moreover, it is possible to control to a certain extent the degree of expansion of the polymer by adjusting the cooling speed. In fact, by suitably delaying or anticipating the cooling of the polymer which forms the expanded coating at the extruder outlet, it is possible to increase or decrease the degree of expansion of said polymer.

According to the present invention, the degree of expansion may vary from 5% to 500%, preferably from 30% to 300%, even more preferably between 40% and 150%.

As already mentioned above, the expanded polymeric material may or may not be cross-linked. The cross-linking is performed, after the extrusion step or the moulding and expansion step, using known techniques, in particular by means of heating with a free-radical initiator, for example an organic peroxide such as dicumyl peroxide. Alternatively, it is possible to perform cross-linking using silanes, which envisages the use of a polymer belonging to the abovementioned group, in particular a polyolefin, to which silane units comprising at least one hydrolizable group, for example trialkoxysilane groups, in particular trimethoxysilane, have been covalently bonded. The bonding of the silane units may be performed by means of a free-radical reaction with silane compounds, for example methyltriethoxysilane, dimethyl diethoxysilane, vinyl dimethoxysilane, and the like. Cross-linking is conducted in the presence of water and a cross-linking catalyst, for example an organic titanate or a metallic carboxylate. Dibutyltin dilaurate (DBTL) is particularly preferred.

The protective coating according to the present invention is applicable to any type of joint, as well as to any type of cable to be joined, be it a cable for conveying or supplying energy or a data transmission cable or a telecommunications cable, or a cable of the mixed energy/telecommunications type. In this sense, therefore, the term "conductor" is understood as meaning a conductor of the metallic type, with a circular or segment-like configuration, or comprising optical fibres or of the mixed electrical/optical type.

EXAMPLE 1

A protective coating according to the present invention, for example of the type illustrated in FIG. 4, was manufactured using a polymeric material commercially known by the name HIGRAN SD 817® (produced by Montell S.p.A.). This material is a, high melt strength polypropylene mixed with an ethylene/propylene rubber in a percentage ratio by weight of 80/20.

This coating was produced by means of extrusion using an 80 mm single-screw extruder in a 25 D configuration, with a speed of rotation of said screw equal to 15 revolutions per minute.

In the extruder and in the extrusion head the thermal profile shown in Table I was used.

TABLE I

| Extruder zone | Temperature (° C.) |
|---|---|
| Screw | Neutral |
| Zone 1 | 150 |
| Zone 2 | 180 |
| Zone 3 | 200 |
| Zone 4 | 200 |
| Body | 210 |
| Head | 200 |
| Mould | 200 |

The temperature of the melt was about 210–220° C.

Expansion of the polymeric material was obtained chemically, by adding into the hopper of the extruder (by means of a feeder screw controlled by means of a gravimetric metering device), the expanding agent Hydrocerol® BIH40 (citric acid/sodium bicarbonate), produced by Clariant, in a quantity equal to 1.5% by weight with respect to the polymer base material.

The protective coating thus obtained had a thickness of about 10 mm.

Said coating was then applied onto the external surface, namely onto the external polymeric sheath, of a conventional joint of the single-phase Elaspeed® type, used for joining together a pair of single-pole electrical cables with a copper conductor having a cross section of 150 mm$^2$ and an operating voltage of 20 kV.

The total length of the joint was about 800 mm and its external diameter was about 50 mm. The external diameter of the protective coating was about 70 mm.

Impact resistance test

The mechanical impact strength of the abovementioned joint, provided with the protective coating according to the present invention was assessed by carrying out impact tests on several zones of the joint, with subsequent evaluation of the damage. This evaluation was carried out by means of a visual analysis of the joint at each point of impact and by means of measurement of the resistance of the joint insulation.

This test was carried out in accordance with the CENELEC Standard No. HD 628 S1 dated December 1995 which envisages the positioning of a joint on a rigid support, in a horizontal position with respect to the latter, namely with the longitudinal axis of this joint parallel to said support. If necessary, sand may be arranged around the joint in order to impart greater stability to the said joint—in view of the variations in cross section which characterize it—during the test.

Before the actual impact test, the resistance of the joint insulation was measured in accordance with the procedures indicated in the abovementioned standard.

Subsequently an impacting wedge having a V-shaped end with a slightly rounded form (radius of curvature of 2 mm) was allowed to fall from the same height (1000 mm) onto three different zones of the joint. In greater detail, the impacting wedge was positioned so as to strike both ends of the joint, at the point where the cross section of the said joint starts to change and at an intermediate position which is central with respect to the joining zone. In order to produce different impact forces (J), impacting wedges with different weights were used.

The joint was then immersed in water for 24 hours and measurement of the resistance of the abovementioned joint insulation was repeated, said measurement having the same value recorded at the start of the test.

At the end of the tests, the protective coating according to the present invention was removed in the impact zones and the external polymeric sheath and the insulating coating of the joint analysed in order to assess visually the presence or otherwise of any residual deformation due to the impact of the wedge.

The results of said tests are summarized in Table 2.

Measurement of the Thermal Conductivity

As will emerge more clearly in the continuation of the present description, in order to be able to calculate the thermal resistance of the protective coating according to the invention, measurements the thermal conductivity were carried out on the material used.

These measurements were carried out on the basis of the standard ASTM E 1530.

At the maximum operating temperature of a joint, equal to about 80° C., and for an expansion value of the abovementioned material equal to 45%, a thermal conductivity value of 0.11 W/° C.*m was obtained.

Since the thermal resistivity is equal to the inverse of the thermal conductivity, the thermal conductivity value obtained above had a corresponding thermal resistivity value of 9° C.*m/W.

EXAMPLE 2 (COMPARISON)

In a similar manner to that described in Example 1, a single-phase Elaspeed® joint (of the same type as that used in Example 1) was provided, in a position radially outside the latter, with a protective container of the known art.

In greater detail, this container consisted of an aluminium muffle with an internal diameter of 110 mm, filled with a polyurethane resin having a thermal resistivity, typical of this material, of 6.5 C*m/W. The thickness of said resin inside said muffle was 30 mm.

This joint was then subjected to impact resistance tests in a similar manner to that described in Example 1. The results obtained are summarized in Table 2.

Further below in the present description, the thermal resistance value of the abovementioned resin layer was calculated and compared with the thermal resistance value of the protective coating according to the invention.

EXAMPLE 3 (COMPARISON)

Impact resistance tests, as described in Example 1, were also carried out on a single-phase Elaspeed® joint (of the same type as that used in the two preceding examples), but without any protective coating. The results obtained are shown in Table 2.

TABLE 2

| Impact energy applied | Joint according to Example 1 (invention) | Joint according to Example 2 (comparison) | Joint according to Example 3 (comparison) |
|---|---|---|---|
| 40 J (weight of wedge: 4 kg) | No damage | No damage | Not acceptable |
| 80 J (weight of wedge: 8 kg) | No damage | Slight damage | Not acceptable |
| 120 J (weight of wedge: 12 kg) | No damage | Damage at barely acceptable limit | Not performed |

TABLE 2-continued

| Impact energy applied | Joint according to Example 1 (invention) | Joint according to Example 2 (comparison) | Joint according to Example 3 (comparison) |
|---|---|---|---|
| 160 J (weight of wedge: 16 kg) | Minimal external damage. No internal damage | Not acceptable | Not performed |

The results of the impact tests show that the protective coating according to the invention, for the same impact force applied, ensures a mechanical strength greater than or equal to that provided by the protective devices according to the known art.

More particularly, the results obtained show how a joint provided with a protective coating according to the invention does not have any structural damage (namely any damage to the insulating layer) also in the case of impact force values considerably higher than the acceptability limit of 120 J of joints protected in a conventional manner.

Calculation of the Thermal Resistance

It is known that:

$$P = R_e \; I^2 = \frac{\Delta T}{R_{tot}} \quad (1)$$

where:
P is the power supplied by a cable;
$R_e$ is the electrical resistance of the conductor of the cable;
I is the intensity of electric current flowing in the cable;
$\Delta T$ is the difference between the temperature of the conductor and the temperature of the ground surrounding the system in question;
$R_{tot}$ is the total thermal resistance of this system.

From formula (1) the following is obtained:

$$I = \sqrt{\frac{\Delta T}{R_e \; R_{tot}}} \quad (2)$$

Considering that:
a) once the type of conductor has been chosen both in terms of material and in terms of geometry of the cross section, the value of Re is univocally defined;
b) assuming T=20° C. for the temperature of the ground and T=90° C. for the maximum operating temperature of the system, $\Delta T$=70° C.=cost, the result of formula (2) is that the intensity of current flowing in the system is greater the smaller the value of $R_{tot}$.

It is known, moreover, that the thermal resistance of a layer made of a given material is defined as:

$$Rp = \rho_t \frac{\ln \frac{\phi_e}{\phi_i}}{2\pi} \quad (3)$$

where:
$R_p$ is the thermal resistance of said layer;
$\rho_t$ is the thermal resistivity of the material from which said layer is made;
$\phi_e$ is the external diameter of said layer;
$\phi_i$ is the internal diameter of said layer.

Let us assume now that the system considered is a joint provided with a protective coating, as described in Examples 1 and 2 above.

In this case, the total thermal resistance $R_{tot}$ of the system is defined by the following parameters:

$$R_{tot} = R_{is} + R_g + R_p + R_{te} \quad (4)$$

where:
$R_{is}$ is the thermal resistance of the cable insulating material;
$R_g$ is the thermal resistance of the joint;
$R_p$ is the thermal resistance of the protective coating of said joint;
$R_{te}$ is the thermal resistance of the ground.

It is therefore possible to distinguish between the following cases:
1) Joint provided with the Protective coating according to Example 1.
Assuming that:
$\phi_e$=70 mm is the external diameter of the protective coating according to the invention;
$\phi_i$=50 mm is the internal diameter of said coating, coinciding with the external diameter of the joint;
$\rho_t$=9° C.*m/W is the thermal resistivity of the material from which the protective coating according to the invention is made,
applying the formula (3), the following is obtained:

$$Rp_1 = 9 \frac{\ln \frac{70}{50}}{2\pi} = 0.48° \; C. *m/W \quad (5')$$

where $Rp_1$ is the thermal resistance of the protective coating according to the present invention.
2) Joint provided with the protective coating according to Example 2.
Assuming that:
$\phi_e$=110 mm is the external diameter of the protective coating according to the known art;
$\phi_i$=50 mm is the internal diameter of said coating, coinciding with the external diameter of the joint;
$\rho_t$=6.5° C.*m/W is the thermal resistivity of the resin forming the abovementioned protective coating, applying the formula (3), the following is obtained:

$$Rp_2 = 6.5 \frac{\ln \frac{110}{50}}{2\pi} = 0.82° \; C. *m/W \quad (5'')$$

where $Rp_2$ is the thermal resistance of the protective coating made of resin according to the known art.

From the above calculations it is possible to note how the thermal resistance ($Rp_1$) of the protective coating according to the present invention is equal to about half the thermal resistance ($Rp_2$) of the protective coating made of resin according to the known art.

Moreover, assuming that:
a) the diameter of the conductor is 20 mm;
b) the external diameter of the cable insulating material is 30 mm;

c) the thermal resistivity of the cable insulating material and the joint is typically 3.6° C.*m/W, applying the formula (3) the following is obtained:

$$R_{is} = 3.6 \frac{\ln\frac{30}{20}}{2\pi} = 0.23° \text{ C.} * \text{m/W} \quad (6)$$

$$R_{g} = 3.6 \frac{\ln\frac{50}{30}}{2\pi} = 0.3° \text{ C.} * \text{m/W} \quad (7)$$

Moreover, a typical value for the thermal resistance of the ground is:

$$R_{te} = 0.3° \text{ C.*m/W} \quad (8)$$

Applying the formula (4) and taking into account the results (5'), (5"), (6), (7) and (8), the following is obtained:

a) $R_{tot}$ 1.31° C.*m/W using the protective coating according to the invention, and b) $R_{tot}$ 1.65° C.*m/W using the resin coating according to the known art.

From the above it therefore emerges that, with the protective coating according to the present invention, it is possible to obtain a thermal resistance of the protective coating which is about 20-25% less than the thermal resistance of the protective coating according to the known art (Example 2). On the basis of the abovementioned formula (2) it is therefore possible to note that a current intensity greater than that of the known art may be permitted with the protective coating according to the present invention.

It has to be emphasized how this result has been achieved using a protective coating which, as illustrated further above with reference to Table 2, provides a mechanical impact strength at least equal to, and in some cases even better than, that of the known art, thereby meaning that the reduction in the thermal resistance of the protective coating has not been obtained at the cost of a deterioration in the mechanical properties of the latter.

Moreover, it must be emphasized also that these advantageous results in terms of thermal resistance and mechanical impact strength have been obtained with a protective coating having a thickness considerably less than that of the known art (10 mm in Example 1 compared to 30 mm in Example 2). This means, therefore, that, with the protective coating according to the invention, it will be possible to prepare a joint/protective coating system having overall dimensions which are decidedly smaller and with a lower weight, aspects which are regarded as being particularly positive in view of the restricted spaces which are typical of trenches used for laying a cable.

It is necessary, moreover, to underline the fact that the abovementioned examples refer to a joint with extremely small dimensions. The person skilled in the art may therefore easily understand how the advantageous effects of the protective coating according to the present invention are even more obvious the greater the dimensions of the joint considered (for example a joint for three-pole cables or a high-voltage joint).

The present invention offers some major advantages compared to the known art.

A first advantage consists in the fact that, as already mentioned, the protective coating according to the invention represents a simpler and more rapid solution to implement compared to those of the known art.

In fact, as already mentioned, the metal protective containers, which are widely used as mechanical reinforcements for the joining zone of two cables involve: 1) assembly difficulties, which are all the greater in that the operations are performed in narrow and uncontrolled environments such as laying trenches; 2) the need for particularly delicate and complex additional operations such as the introduction of a filling material inside the container; 3) problems of toxicity and handling of said filling material in the case where epoxy and polyurethane resins are used; 4) long assembly times; 5) difficulty—owing to the rigidity of the container—of adaptation to the external profile of the joint; 6) intense use of specialized labour.

The present invention, on the other hand, is able to overcome these disadvantages owing to a greater simplicity of use due to both the elimination of the abovementioned filling material and the greater ease of handling of the invention, also as a result of the limited weight thereof. It can be clearly understood that the elimination of the abovementioned disadvantages results in a considerable reduction in costs, installation time and difficulties for personnel working inside the trenches.

Further advantages of the protective coating according to the present invention consist in the high mechanical strength which said coating is able to ensure, while permitting a thickness—and therefore the overall dimensions of the protective joint—which are particularly small and an excellent heat transfer between joint and external environment.

The abovementioned protective coating has, in fact, a high capacity for absorbing impacts, reducing considerably the impact force actually transferred to the underlying joint, in particular to the insulating coating of the latter. Owing to this high absorption capacity, therefore, it is possible to reduce considerably the thickness of the coating, resulting in the advantage of smaller overall dimensions of the joint and easier handling and simpler installation of the said coating. Moreover, a reduction in this thickness also results in a particularly advantageous aspect in terms of the heat exchange between joint and external environment since, as already mentioned, the thermal resistance is directly proportional to the thickness.

With the coating according to the present invention, moreover, it is possible to provide a protective layer of the continuous type which, unlike the known art, is able to ensure a mechanical impact strength over the whole external surface of the joint without giving rise to the formation of portions which are unprotected or partially protected and, therefore, potentially liable to damage.

The invention claimed is:

1. A joint for electrical cables designed to convey or supply energy, said joint comprising:

at least one electrical connection between a conductor of a first electrical cable and a conductor of a second electrical cable;

at least one electrical insulating layer arranged in a position radially outside said connection; and a protective coating arranged in a position radially outside said electrical insulating layer, said coating comprising an expanded polymeric material suitable for providing said connection with a mechanical impact strength and, at the same time, ensuring a predetermined heat exchange between said connection and the external environment, wherein said protective coating comprises a plurality of modular components arranged around said connection, said modular components being connected to one another at their respective edges such that said protective coating is axially and circumferentially continuous with respect to said connection, wherein further said modular components enable the circumference of said protective coating to be adjusted to fit around joints of varying size through the addition or removal of one or more of said modular components.

2. The joint according to claim 1, wherein said heat exchange ensures that said connection operates at a temperature less than the maximum operating temperature of said connection.

3. The joint according to claim 2, wherein the maximum operating temperature is equal to about 80° C.

4. The joint according to claim 1, wherein said expanded polymeric material is a polyolefinic polymer or copolymer based on ethylene or propylene.

5. The joint according to claim 1, wherein said expanded polymeric material has a degree of expansion between approximately 5% and approximately 500%.

6. The joint according to claim 5, wherein the degree of expansion is between 30% and 300%.

7. The joint according to claim 6, wherein the degree of expansion is between 40% and 150%.

8. The joint according to claim 1, wherein the expanded polymeric material has a thickness of between 3 mm and 25 mm.

9. The joint according to claim 8, wherein the thickness is between 3mm and 15mm.

10. The joint according to claim 1, wherein said expanded polymeric material is an extruded or molded polymeric material expanded in the presence of an expanding agent.

11. The joint according to claim 10, wherein said expanding agent is a high-pressure gas.

12. The joint according to claim 1, wherein said expanded polymeric material is cross-linked.

13. The joint according to claim 1, wherein each of said plurality of modular components is elongated and comprises a substantially Y-shaped cross-section, wherein a base of said Y-shaped cross-section of a first of said modular components is adapted to mate with a diverging portion of said Y-shaped cross-section of a second of said modular components.

14. A joint for electrical cables designed to convey or supply energy, said joint comprising:
   at least one electrical connection between a conductor of a first electrical cable and a conductor of a second electrical cable;
   at least one electrical insulating layer arranged in a position radially outside said connection; and
   a protective coating arranged in a position radially outside said electrical insulating layer, said coating comprising an expanded polymeric material suitable for providing said connection with a mechanical impact strength and, at the same time, ensuring a predetermined heat exchange between said connection and the external environment, wherein said protective coating comprises a plurality of modular components, said modular components being linked together at joints such that said protective coating is axially and circumferentially continuous with respect to said connection, said modular components being partially free to slide relative to one another at said joints without said protective coating becoming axially or circumferentially discontinuous.

15. The joint according to claim 14, wherein said heat exchange ensures that said connection operates at a temperature less than the maximum operating temperature of said connection.

16. The joint according to claim 15, wherein the maximum operating temperature is equal to about 80° C.

17. The joint according to claim 14, wherein said expanded polymeric material is an extruded or molded polymeric material expanded in the presence of an expanding agent.

18. The joint according to claim 14, wherein said expanded polymeric material has a degree of expansion between approximately 5% and approximately 500%.

19. The joint according to claim 14, wherein the expanded polymeric material has a thickness of between 3 mm and 25 mm.

20. The joint according to claim 14, wherein each of said plurality of modular components is elongated and comprises a substantially Y-shaped cross-section, wherein a base of said Y-shaped cross-section of a first of said modular components is adapted to mate with a diverging portion of said Y-shaped cross-section of a second of said modular components.

* * * * *